United States Patent
Inoue et al.

(10) Patent No.: US 8,154,163 B2
(45) Date of Patent: Apr. 10, 2012

(54) ELECTRIC POWER COLLECTION/DISTRIBUTION RING OF ROTARY ELECTRIC MACHINE

(75) Inventors: Masashi Inoue, Saitama (JP); Hiroyuki Sato, Utsunomiya (JP); Minoru Nakajima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 402 days.

(21) Appl. No.: 12/422,699

(22) Filed: Apr. 13, 2009

(65) Prior Publication Data

US 2009/0256439 A1 Oct. 15, 2009

(30) Foreign Application Priority Data

Apr. 15, 2008 (JP) ............................... P2008-105539
Apr. 15, 2008 (JP) ............................... P2008-105540

(51) Int. Cl.
*H02K 3/52* (2006.01)
(52) U.S. Cl. ......................................................... 310/71
(58) Field of Classification Search ...................... 310/71
See application file for complete search history.

(56) References Cited

U.S. PATENT DOCUMENTS

| | | | |
|---|---|---|---|
| 5,828,147 A | 10/1998 | Best et al. | |
| 7,034,419 B2 * | 4/2006 | Kabasawa et al. | 310/71 |
| 7,164,217 B2 * | 1/2007 | Kabasawa et al. | 310/71 |
| 7,476,995 B2 * | 1/2009 | Uchiyama et al. | 310/71 |
| 2004/0066103 A1 * | 4/2004 | Ohuchi et al. | 310/71 |
| 2004/0070293 A1 * | 4/2004 | Kabasawa et al. | 310/71 |
| 2004/0135457 A1 | 7/2004 | Holzheu et al. | |
| 2006/0091745 A1 | 5/2006 | Klappenbach et al. | |
| 2007/0080592 A1 * | 4/2007 | Ohta et al. | 310/71 |

FOREIGN PATENT DOCUMENTS

| | | |
|---|---|---|
| DE | 10261611 A1 | 7/2004 |
| EP | 0863601 A1 | 9/1998 |
| JP | 2004-056873 A | 2/2004 |
| JP | 2004-096841 | 3/2004 |
| JP | 2005-229677 A | 8/2005 |
| JP | 2007-014083 | 1/2007 |
| JP | 2008-086080 A | 4/2008 |
| WO | 02073773 A1 | 9/2002 |

OTHER PUBLICATIONS

Notice of Reasons for Rejection for Japanese application No. 2008-105539 mailed Nov. 17, 2009.

* cited by examiner

*Primary Examiner* — Quyen Leung
*Assistant Examiner* — Naishadh Desai
(74) *Attorney, Agent, or Firm* — Squire Sanders (US) LLP

(57) ABSTRACT

An electric power collection/distribution ring of a rotary electric machine including: a plurality of ring shaped bus rings each of which is to be connected to one of a plurality of coils provided in the rotary electric machine, the coils each corresponding to phases of the rotary electric machine; a plurality of fixing member which are fixed to the bus rings and arranged along the circumferential direction thereof; and a plurality of connection terminals which are fixed to the bus rings and arranged along said circumferential direction, and which can be connected with one of leader line sections of the coils.

14 Claims, 14 Drawing Sheets

ELECTRIC POWER COLLECTION/DISTRIBUTION RING OF ROTARY ELECTRIC MACHINE

BACKGROUND OF THE INVENTION

Priority is claimed on Japanese Patent Application No. 2008-105539, filed Apr. 15, 2008, and Japanese Patent Application No. 2008-105540, filed Apr. 15, 2008, the contents of which are incorporated herein by reference.

FIELD OF THE INVENTION

The present invention relates to an electric power collection/distribution ring (connection structure for electric power collection/distribution) of a rotary electric machine.

DESCRIPTION OF THE RELATED ART

Heretofore, for example, there has been known a motor in which a plurality of concentrated winding stator coils is connected by means of fusing (thermal caulking) into a ring shaped bus ring. In this motor, the connection between the plurality of concentrated winding stator coils and the ring shape bus ring is achieved by: arranging wire connection members so as to be adjacent to U-shape curved terminal sections in the circumferential direction, the terminal sections protruding from the bus ring in the axial direction thereof; connecting one ends of the terminal sections to one ends of the wire connection members by means of fusing; and connecting the stator coil to other ends of each of the wire connection members by means of fusing (for example, refer to Japanese Unexamined Patent Application, First Publication No. 2004-96841).

Moreover, conventionally, there has been known a collection/distribution member of a three phase motor in which three polygonal ring shaped bus bars, to which winding wires corresponding to the phases are to be connected, are held to each other by three types of clips made of synthetic resins in a state where the bus bars are coaxially arranged (for example, refer to Japanese Unexamined Patent Application, First Publication No. 2007-14083).

In this collection/distribution member, a first clip is attached to a straight line section of each polygonal ring shaped bus bar from the radially outer side toward the radially inner side. Moreover, to connection end sections of these bus bars, there are attached a second and a third clips. Furthermore, a closed area formed by these second and third clips is filled with a filling agent.

In the motor according to the above first conventional technique, when connecting the stator coil to the bus ring via the wire connection member, there is a need for performing fusing in two places in the circumferential direction, namely; between the wire connection members and the terminal sections, and between the wire connection members and the stator coil. Consequently, a comparatively large working area is required for the fusing operation. Therefore, in such a motor, it is difficult to increase the number of pole pairs without increasing the radial direction dimension of the motor for example. As a result, there is a problem of a reduced degree of freedom in the spatial designing for the motor. In addition, since a plurality of the U shape-curved terminal sections is provided in the bus ring, a space is required for housing these terminals. As a result, there is a problem of a further increase in the size of the motor.

Moreover, in the electric power collection/distribution member of the motor according to the above second conventional technique, a plurality (three types) of different clips are used for holding the three phase bus bars to each other, and consequently the number of components and the cost required for the configuration thereof increases. As a result, there is a problem in that the manufacturing steps of the electric power collection/distribution member become cumbersome.

In view of the above-described circumstances, the present invention has an object of providing an electric power collection/distribution ring (connection structure for current distribution) of a rotary electric machine which enables the size of the rotary electric machine to be appropriately reduced, the number of components and the cost required for the configuration thereof to be reduced, and furthermore the manufacturing steps thereof to be simplified, while ensuring a desired output.

SUMMARY OF THE INVENTION

In order to solve the above problems and achieve the related object, the present invention employs the following. That is to say, an electric power collection/distribution ring (current distributing connection structure) of a rotary electric machine according to a first aspect of the present invention includes: a plurality of ring shaped bus rings each of which is to be connected to one of a plurality of coils provided in the rotary electric machine, the coils each corresponding to phases of the rotary electric machine; a plurality of fixing member which are fixed to the bus rings and arranged along the circumferential direction thereof; and a plurality of connection terminals which are fixed to the bus rings and arranged along said circumferential direction, and which can be connected with one of leader line sections of the coils.

According to the above first aspect of the present invention, since the connection terminals that can be connected to one of the leader line sections of the coils is fixed in a predetermined position, it is possible to easily connect each coil to one of the bus ring via the connection terminal only in a single operation of connecting between the leader line section of each coil and one of the connection terminal by means of fusing (thermal caulking) or the like. Moreover, it is possible to prevent an excessive increase in the working area required for this connecting operation, while preventing a reduction in the degree of freedom in the spatial designing for the rotary electric machine. Furthermore, it is possible to reduce the number of components and the cost required for the configuration thereof, while simplifying the manufacturing steps.

Moreover, in an electric power collection/distribution ring of a rotary electric machine according to a second aspect of the present invention, the connection terminals extends radially inward from the bus rings; the fixing members are formed by performing molding of resin material on the bus rings; and the connection terminals and the fixing members are arranged so as not to overlap on each other in said circumferential direction.

According to the above second aspect of the present invention, since the connection terminals and the fixing members are arranged so as not to overlap on each other in the circumferential direction, it is possible to appropriately ensure a desired working area required for molding with use of a resin material.

Furthermore, in an electric power collection/distribution ring of a rotary electric machine according to a third aspect of the present invention, insulating members that each hold one of the coils has a holding member which positions and fixes one of the leader line sections of the coils.

According to the above third aspect of the present invention, it is possible to improve the precision in positioning the leader line section of the coil.

Furthermore, in an electric power collection/distribution ring of a rotary electric machine according to a fourth aspect of the present invention, each of the holding members is arranged in a position displaced from the center axis of the insulating members in said circumferential direction.

According to the above fourth aspect of the present invention, when leading out the leader line section radially outward from the coil wound on the insulating member, it is possible to appropriately perform a bending process. For example, even in the case where edgewise bending is required in a rectangular wire, it is possible to prevent a disturbance being generated in wire winding.

Furthermore, in an electric power collection/distribution ring of a rotary electric machine according to a fifth aspect of the present invention, the connection terminals have: a bus ring fixing section which is fixed on the bus rings; an extended section which extends radially inward from the bus ring fixing section; and a coil connection section to be connected with the leader line section of the coils in a tip of the extended section, the bus ring fixing section and the coil connection section being arranged so that positions thereof overlap on each other in said circumferential direction, the holding member being arranged in between the bus ring fixing section and the coil connection section, and the extended section including a bypass section which bypasses the holding member.

According to the above fifth aspect of the present invention, it is possible to prevent an excessive increase in the size of the connection terminal, and therefore it is possible to prevent a reduced degree of freedom in the spatial designing for the rotary electric machine.

Moreover, the bypassing section may be provided with a curved section that curves in the circumferential direction.

In an electric power collection/distribution ring of a rotary electric machine according to a sixth aspect, the connection terminals are provided with: a bus ring fixing section which is fixed on one of the bus rings; an extended curvature section which extends radially inward from the bus ring fixing section and that curves in said circumferential direction; and a coil connection section which is to be connected with one of the leader line sections in a tip of the extended curvature section, the coil connection section being arranged on the inner side of the fixing members in the radial direction of the bus ring.

According to the above sixth aspect of the present invention, it is possible with the fixing members made of an insulative material to ensure desired insulation between the bus rings and the coil connection sections. Moreover, a closed space to be filled with an insulating agent, around the bus rings and the coil connection sections, can be formed by the insulating members on which the coil is mounted and the fixing members.

Furthermore, in an electric power collection/distribution ring of a rotary electric machine according to a seventh aspect of the present invention, the bus rings are sandwiched at both sides thereof by the fixing members so as to be mutually fixed.

According to the above seventh aspect of the present invention, it is possible to easily fix each bus ring with the fixing members that sandwich each bus ring at both sides thereof in the radial direction.

Furthermore, in an electric power collection/distribution ring of a rotary electric machine according to an eighth aspect of the present invention, insulating members that each hold one of the coils has a holding member which positions and fixes one of the leader line sections of the coils.

According to the above eighth aspect of the present invention, it is possible to improve the precision in positioning the leader line section of the coils.

Furthermore, in an electric power collection/distribution ring of a rotary electric machine according to a ninth aspect of the present invention, each of the holding members is arranged in a position displaced from the center axis of the coils in said circumferential direction.

According to the above ninth aspect of the present invention, when leading out the leader line section radially outward from the coils, it is possible to appropriately perform a bending process. For example, even in the case where edgewise bending is required in a rectangular wire, it is possible to prevent a disturbance being generated in wire winding.

In addition, the present invention employs a stator including: the above-described electric power collection/distribution ring of a rotary electric machine; and an electric power collection/distribution ring housing section that houses the electric power collection/distribution ring, wherein: the electric power collection/distribution ring housing section has an insulating member that holds the coils; and the insulating member has a holding member that positions and fixes one of the leader line sections of the coils.

DETAILED DESCRIPTION OF THE INVENTION

First Embodiment

Hereunder, an electric power collection/distribution ring (connection structure for electric power collection/distribution) of a rotary electric machine according to a first embodiment of the present invention is described, with reference to the drawings.

The electric power collection/distribution ring of a rotary electric machine according to the present embodiment (for example, an electric power collection/distribution member 13 described later) may be used for a stator 1 of a rotary electric machine to be installed, for example, as a travelling drive source in a vehicle such as a hybrid vehicle or an electric vehicle.

Figure 1:
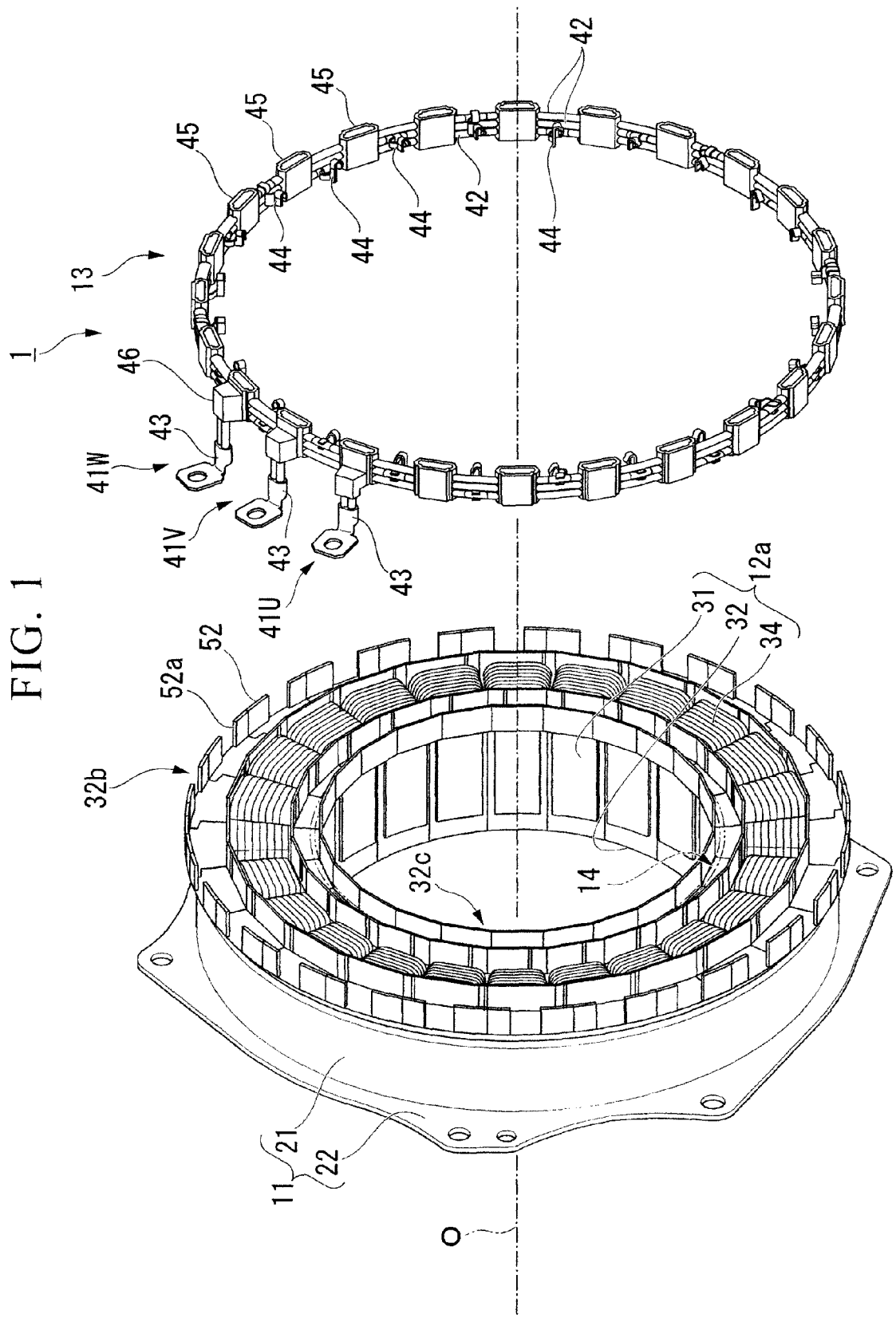
FIG. 1 is an exploded perspective view of a stator according to a first embodiment of the present invention.
Figure 2:
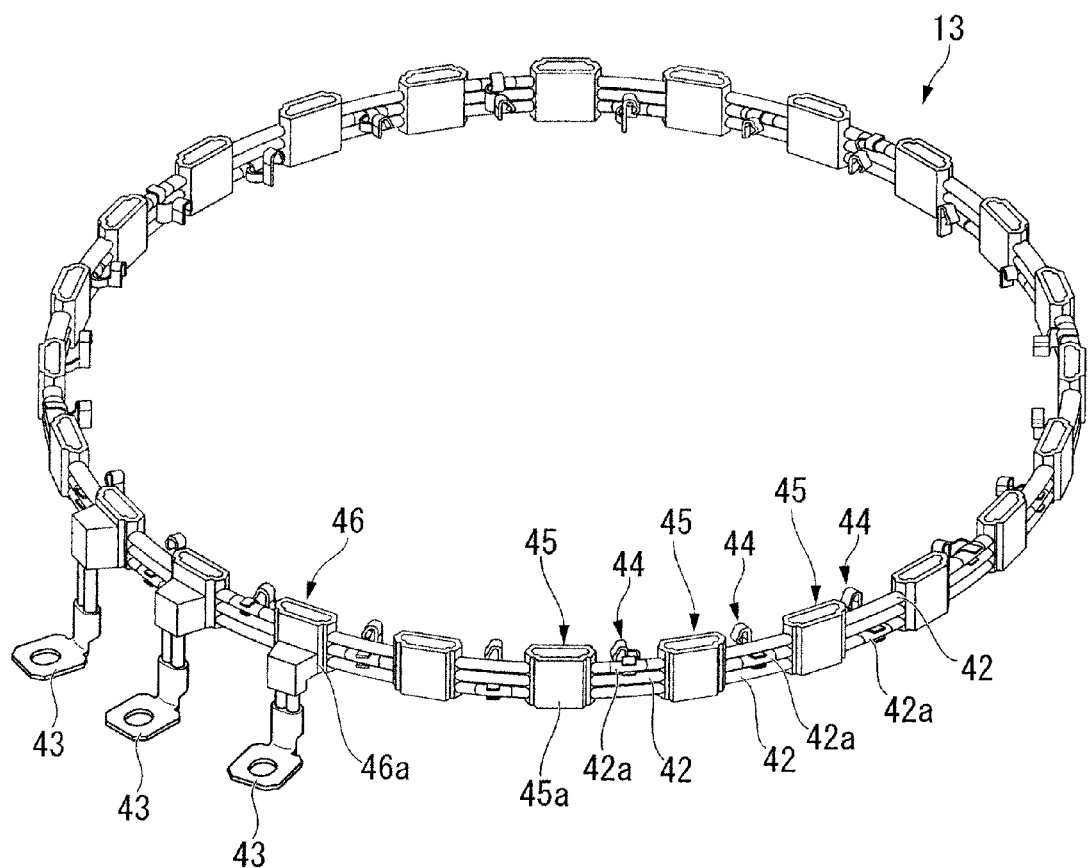
FIG. 2 is a perspective view showing a principal part of an electric power collection/distribution member according to the embodiment.
Figure 3:
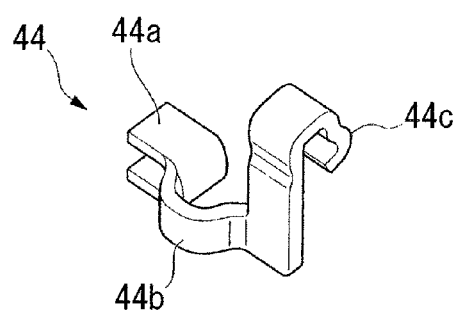
FIG. 3 is a perspective view of a connection terminal according to the embodiment.
Figure 4:
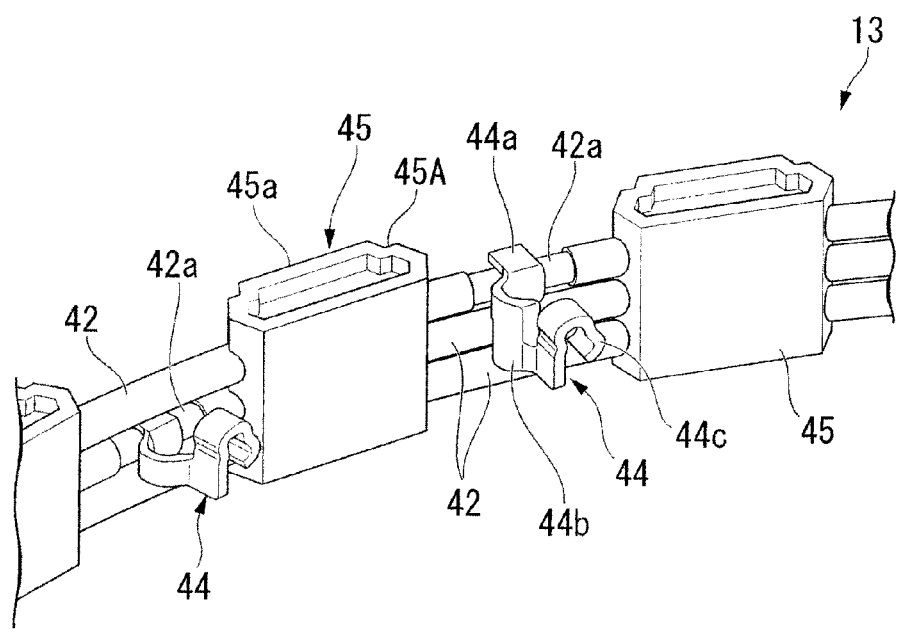
FIG. 4 is a perspective view showing a principal part of an electric power collection/distribution member according to the embodiment.
Figure 5:
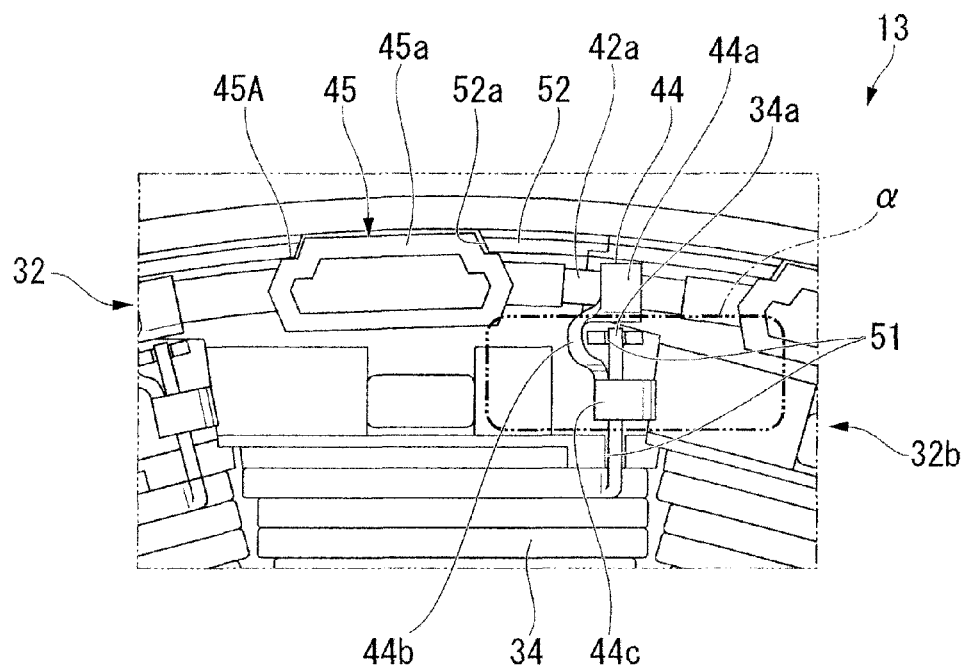
FIG. 5 is a plan view showing a principal part of the stator according to the embodiment.
Figure 6:
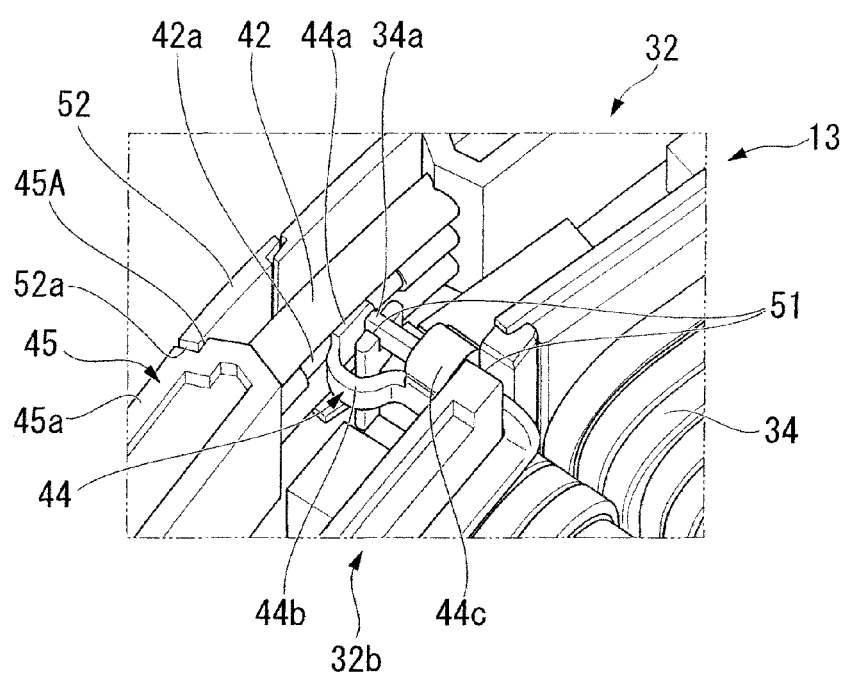
FIG. 6 is a perspective view showing a principal part of the stator according to the embodiment.
Figure 7:
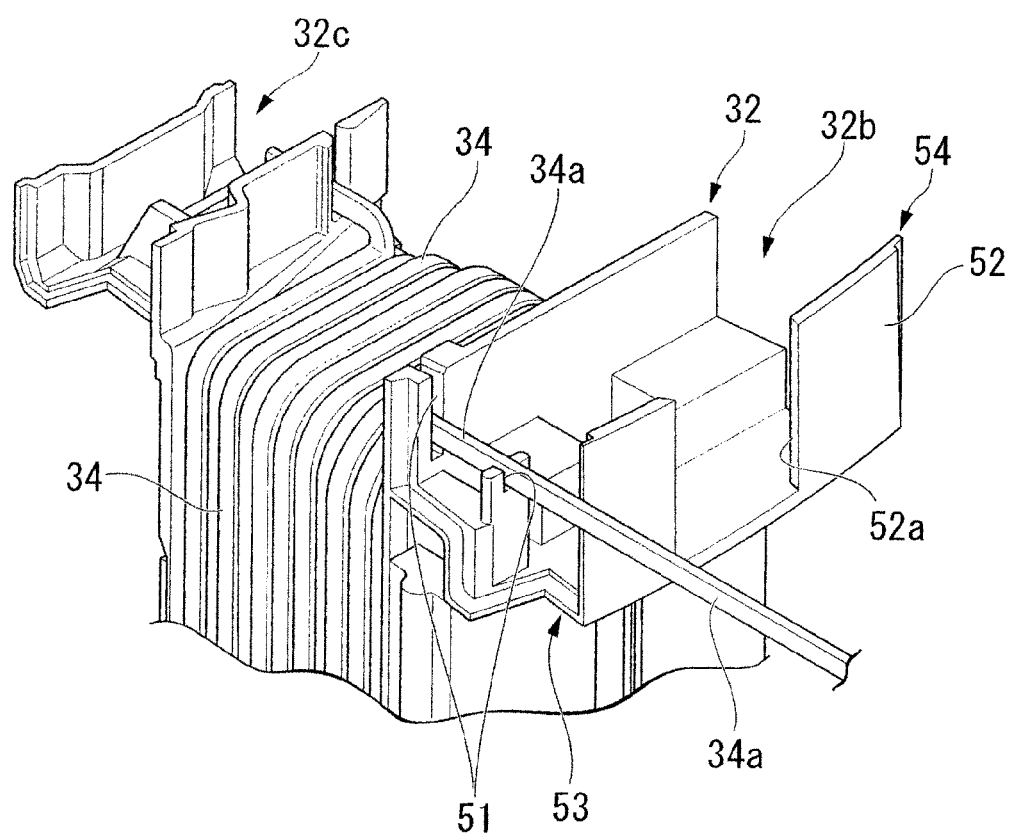
FIG. 7 is a perspective view showing a principal part of an insulating bobbin and an electric power collection/distribution member housing section according to the embodiment.
Figure 8:
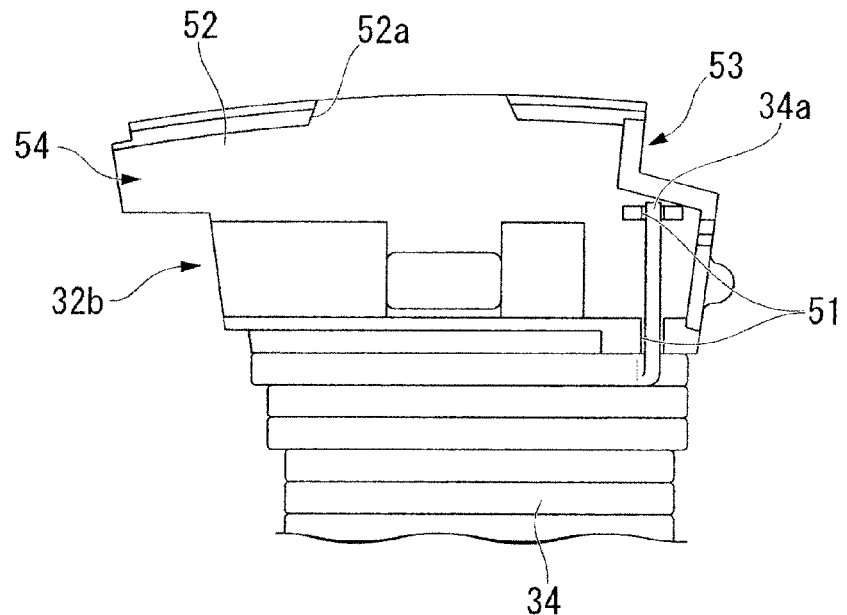
FIG. 8 is a plan view showing a principal part of the insulating bobbin and the electric power collection/distribution member housing section according to the embodiment.
Figure 9:
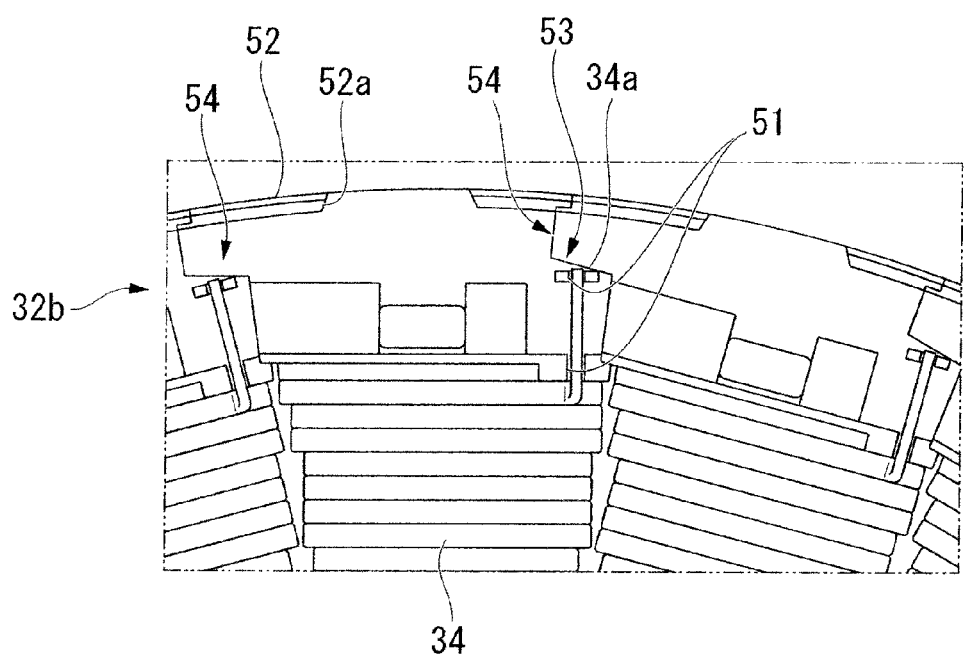
FIG. 9 is a plan view showing the principal part of the insulating bobbin and the electric power collection/distribution member housing section according to the embodiment.

The stator 1, for example, is an inner rotor type stator in which a rotor (not shown in the drawing) is to be arranged on the inner circumferential side thereof as shown in FIG. 1.

The stator 1 is provided, for example, with a stator holder 11, a ring shaped stator set 12 including a plurality of stator pieces 12a arranged in a ring shape, a ring shaped electric power collection/distribution member 13, and a middle point connection member 14.

The stator holder 11 is provided with a cylindrical section 21, and a flange section 22 that is provided so as to project radially outward at one end thereof in the axial direction of this cylindrical section 21.

For example, bolts (not shown in the drawing) inserted through bolt attachment holes (not shown in the drawing) provided in the flange section 22 are screwed on a housing (not shown in the drawing) that houses the cylindrical section 21 therein, and the stator holder 11 is thereby fixed.

Inside the cylindrical section 21 of the stator holder 11 there is housed, by means of press fitting or the like, the ring shaped stator set 12.

The ring shaped stator set 12 includes a predetermined number of the stator pieces 12a arranged in a ring shape.

Each of the stator pieces 12a is provided with a split core 31 formed with a plurality of, for example, substantially T shaped silicon steel plates, an insulating bobbin 32 to be attached on the split core 31 formed with an insulating resin material, and a stator coil 34 wound on the insulating bobbin 32.

The split core 31 is provided with teeth (not shown in the drawing) having mutually substantially equal thicknesses in the axial direction, and a yoke (not shown in the drawing). The yoke is provided integrally with the radial direction base end section of the teeth. The circumferential direction width of the yoke is formed greater than that of the teeth.

Both end surfaces in the circumferential direction of the yoke are of a shape that enables them to surface-contact with each other. In a state with the plurality of stator pieces 12a arranged in a ring shape, the ring shaped stator set 12 in a ring shape is formed, while keeping the yokes adjacent to each other in the circumferential direction in surface-contact with each other.

The insulating bobbin 32 can be split, for example, in the axial direction (that is, in the lamination direction of the split core 31). Insulating bobbin members split into two are attached to the split core 31 so as to sandwich the split core 31 at both sides thereof in the axial direction thereof.

The insulating bobbin 32 is provided with: a bobbin section that for example is externally fitted on the teeth of the split core 31; an electric power collection/distribution member housing section 32b that extends from the bobbin section to the yoke side of the split core 31 (that is, radially outward) so as to cover the other end surface in the axial direction of the yoke; and a middle point connection member housing section 32c that, on the other side in the lamination direction the same as that of the electric power collection/distribution member housing section 32b, extends from the bobbin section in a direction going away from the yoke (that is, radially inward).

On the bobbin section of the insulating bobbin 32 there is wound the stator coil 34.

Moreover, in the electric power collection/distribution member housing section 32b there is housed the electric power collection/distribution member 13. In the middle point connection member housing section 32c there is housed the middle point connection member 14.

The electric power collection/distribution member 13 is provided with ring shaped bus rings 41U, 41V, and 41W corresponding to a plurality of phases that is connected to the plurality of stator coils 34 corresponding to the plurality of phases (for example, three phases namely U phase, V phase and W phase). The bus rings 41U, 41V, and 41W for each phase of the plurality of phases have mutually substantially the same shape. The bus rings 41U, 41V, and 41W are provided with: a ring shaped lead frame 42; a feeding terminal 43 provided on this lead frame 42; a plurality of connection terminals 44 that are fixed in a predetermined position in the circumferential direction of the lead frame 42 (that is, in a position at predetermined intervals in the circumferential direction) so as to protrude radially inward and to be connected to each of the plurality of stator coils 34; a plurality of fixing members 45 having the same shape that are attached in a predetermined position in the circumferential direction of the ring shaped bus rings 41U, 41V, and 41W for the plurality of phases so as to fix the bus rings 41U, 41V, and 41W for the plurality of phases; and a terminal section fixing member 46 that fixes a portion of each of the bus rings 41U, 41V, and 41W in the vicinity of the feeding terminal 43.

Between the respective bus rings 41U, 41V, and 41W, the shape of the lead frames 42, the fixing members 45, and the terminal section fixing members 46 are respectively the same. Moreover, the axial direction length of the feeding terminal 43 is set to a value for each bus ring so that differences in the axial direction position are compensated in a state where the respective bus rings 41U, 41V, and 41W are sequentially and coaxially laminated from one side to the other in the axial direction.

The ring shaped lead frame 42 is such that a conducting wire having an insulating coating thereon (not shown in the drawing) is formed in a ring shape, and one end section and the other end section of the conducting wire, that protrude radially outward and curved toward one side in the axial direction, are connected to the feeding terminal 43.

In a predetermined position in the circumferential direction of the lead frame 42 (that is, in a position at predetermined intervals in the circumferential direction), there is provided a portion (exposed section 42a) in which the insulating coating (not shown in the drawing) has been removed and the conductive wire main body is exposed. On this exposed section 42a there is connected and fixed a bus ring fixing section 44a of the connection terminal 44, for example, by means of fusing (thermal caulking) or the like.

The connection terminal 44, for example as shown in FIG. 2 to FIG. 6, is provided with: the bus ring fixing section 44a fixed on the exposed section 42a of the lead frame 42; an extended curvature section 44b that extends radially inward from the bus ring fixing section 44a and curves so as to bypass a positioning member provided within the electric power collection/distribution member housing section 32b; and a coil connection section 44c that curves in substantially a U shape toward the axial direction in the end section on the radial direction inner side of the extended curvature section 44b. In a state where the electric power collection/distribution member 13 is housed in the electric power collection/distribution member housing section 32b, the circumferential positions of the bus ring fixing section 44a and the coil connection section 44c overlap.

The shapes of the bus ring fixing section 44a of the connection terminal 44 and the coil connection section 44c are designed so that differences in the axial direction position are compensated in a state where the respective bus rings 41U, 41V, and 41W are sequentially and coaxially laminated from one side to the other in the axial direction. In other words, the coil connection section 44c of the connection terminal 44 is such that in consideration of connecting to a leader line section 34a formed on one end of the stator coil 34, for example, by means of fusing (thermal caulking) or the like, the coil connection sections 44c of each connection terminal 44 provided on each of the bus rings 41U, 41V, and 41W are positioned with the same axial direction positions (that is, the connection positions with the leader line section 34a in the axial direction are the same). That is to say, the axial direction positions of each bus ring fixing section 44a of each connection terminal 44 provided in the respective bus rings 41U, 41V, and 41W are mutually different, and consequently the extended curvature section 44b between each bus ring fixing section 44a and the coil connection section 44c has a different shape for each of the bus rings 41U, 41V, and 41W.

A step for configuring the electric power collection/distribution member 13 according to the present embodiment is as follows. First, in the bus rings 41U, 41V, and 41W for each phase, the bus ring fixing section 44a of the connection terminal 44 is preliminarily fixed on the exposed section 42a of the lead frame 42, for example, by means of fusing (thermal caulking) or the like. Next, the bus rings 41U, 41V, and 4W for each phase are sequentially coaxially laminated from one side to the other in the axial direction. In this state, the plurality of ring shaped bus rings 41U, 41V, and 41W are mutually fixed by the fixing members 45 that are formed by means of molding with use of an electrically insulative resin material. Subsequently, the plurality of ring shaped bus rings 41U, 41V, and 41W fixed by the fixing members 45 are fitted within the electric power collection/distribution member housing section 32b. At this time, to the coil connection section 44c of the connection terminal 44 there is attached the leader line section 34a led out radially outward from the stator coil 34. Furthermore, in the coil connection section 44c of the connection terminal 44, for example, connecting operations such as fusing (thermal caulking) are performed, and the lead frame 42 and the stator coil 34 are thereby connected via the connection terminal 44.

In the electric power collection/distribution member housing section 32b there is arranged a positioning member 51 that positions the leader line section 34a led out radially outward from the stator coil 34 wound on the bobbin section of the insulating bobbin 32 while guiding it to the coil connection section 44c of the connection terminal 44. In particular, this positioning member 51 is arranged in a position displaced to one side in the circumferential direction from the circumferential position of the center axis of the stator coil 34 (that is to say, displaced to the winding direction of the conductive wire being wound on the bobbin section of the insulating bobbin 32). Moreover, in a state where the electric power collection/distribution member 13 is housed within the electric power collection/distribution member housing section 32b, the positioning member 51, in the radial direction, is arranged in a position between the bus ring fixing section 44a of the connection terminal 44 and the coil connection section 44c.

The fixing member 45 is formed in a substantially rectangular plate shape by means of molding with use of an electrically insulative resin material so as to cover a predetermined circumferential position of each lead frame 42 of the bus rings 41U, 41V, and 41W that are sequentially and coaxially laminated from one side to the other in the axial direction, (that is, a positions at predetermined intervals in the circumferential direction).

Furthermore, the fixing member 45 is provided with a projecting section 45a that projects radially outward from a surface 46a on the radially outside. It is possible to attach this projecting section 45a to a hole section 52a provided in an outer circumferential wall section 52 of the electric power collection/distribution member housing section 32b. In a state where the electric power collection/distribution member 13 is housed within the electric power collection/distribution member housing section 32b, the projecting section 45a covers in the hole section 52a of the outer circumferential wall section 52.

The outer circumferential wall section 52 of the insulating bobbin 32 is provided so as to cover, from the radially outer side, the electric power collection/distribution member 13 housed within the electric power collection/distribution member housing section 32b. Moreover, in the outer circumferential wall section 52 there is the hole section 52a formed by cutting away a part thereof, the hole section 52a passing therethrough in the radial direction. The hole section 52a is arranged so that the circumferential position of the positioning member 51 and the circumferential position of the connection terminal 44 provided within the electric power collection/distribution member housing section 32 do not overlap on each other, in a state where the electric power collection/distribution member 13 is housed within the electric power collection/distribution member housing section 32b.

Moreover, in the electric power collection/distribution member housing section 32b there is provided a cutaway section 53 formed by cutting away a part of the outer circumferential section thereof. The cutaway section 53 is arranged so that the circumferential position of the positioning member 51 and the circumferential position of the connection terminal 44 provided within the electric power collection/distribution member housing section 32 do not overlap on each other, in a state where the electric power collection/distribution member 13 is housed within the electric power collection/distribution member housing section 32b. That is to say, in an end section on one side in the circumferential direction of the electric power collection/distribution member housing section 32b, there is provided the cutaway section 53 formed by cutting away a part of the outer circumferential section thereof. The cutaway section 53 is provided on the radially outer side of the leader line section 34a that is positioned by the positioning member 51 and is led out radially outward from the stator coil 34. The cutaway section 53 is required for leading out the conductive wire radially outward with a desired tensile force after having been wound on the bobbin section of the insulating bobbin 32 when the stator coil 34 is formed with the conductive wire. Furthermore, the cutaway section 53 is required for arranging a tool or the like (not shown in the drawing) for cutting the conductive wire in a predetermined position in the radial direction when the conductive wire led out radially outward is cut to form the leader line section 34a.

In the end section on the other side in the circumferential direction of the electric power collection/distribution member housing section 32b, there is provided a circumferential direction projecting section 54 that projects toward the other side in the circumferential direction and is fitted to the cutaway section 53 of the electric power collection/distribution member housing section 32b there adjacent in the circumferential direction, Consequently, in the radially outer position of the leader line section 34a positioned by the positioning member 51 of the electric power collection/distribution member housing section 32b, there is arranged the outer circumferential wall section 52 provided in this circumferential direction projecting section 54 of the electric power collection/distribution member housing section 32b adjacent to the electric power collection/distribution member housing section 32b in the circumferential direction.

Within the electric power collection/distribution member housing section 32b with the electric power collection/distribution member 13 housed therein, there is filled an insulative resin material (not shown in the drawing).

The terminal section fixing member 46 is formed by means of molding with use of an electrically insulative resin material so as to cover a portion in the vicinity of the feeding terminal 43 of each lead frame 42 of these bus rings 41U, 41V, and 41W that are sequentially and coaxially laminated from one side to the other in the axial direction.

It is possible, as with the fixing member 45, to attach the terminal section fixing member 46 to the hole section 52a provided in the outer circumferential wall section 52 of the electric power collection/distribution member housing section 32b. The terminal section fixing member 46 is provided with a projecting section 46a that covers in the hole section 52a of the outer circumferential wall section 52 in a state where the electric power collection/distribution member 13 is housed within the electric power collection/distribution member housing section 32b.

Thereby, there is formed by the fixing member 45, the terminal section fixing member 46, and the outer circumferential wall section 52, a closed space around the bus rings 41U, 41V, and 41W and the leading line 34a within the electric power collection/distribution member housing section 32b to be filled with an insulating agent.

The respective bus rings 41U, 41V, and 41W are mutually fixed by a plurality of the fixing members 45 so as to be sequentially and coaxially laminated from one side to the other in the axial direction while being respectively displaced by a predetermined angle. That is to say, the respective connection terminals 44 fixed to the respective lead frames 42 of the respective bus rings 41U, 41V, and 41W, are sequentially arranged at predetermined intervals in the circumferential direction.

The stator coils 34 of the stator pieces 12a corresponding to the same phase are connected to each other. Specifically, the leader line sections 34a formed in one end of the stator coil 34 of each stator piece 12a corresponding to the U phase, are connected to each other via the bus ring 41U. The leader line sections 34a formed in one end of the stator coil 34 of each stator piece 12a corresponding to the V phase, are connected to each other via the bus ring 41V. The leader line sections 34a formed in one end of the stator coil 34 of each stator piece 12a corresponding to the W phase, are connected to each other via the bus ring 41W.

The middle point connection member 14, for example as shown in FIG. 1, is provided with a connecting member 14a that connects other ends of the respective stator coils 34 of the stator pieces 12a adjacent to each other in the circumferential direction by means of fusing (thermal caulking) or the like. The middle point connection member 14 connects the other ends of the stator coils 34 of the stator pieces 12a that correspond to all of the phases. Within the middle point connection member housing section 32c with the middle point connection member 14 housed therein, there is filled an insulative resin material (not shown in the drawing).

As described above, according to the electric power collection/distribution ring of the rotary electric machine according to the present embodiment, in the ring shaped bus rings 41U, 41V, and 41W for the plurality of phases fixed by the fixing member 45 and the terminal section fixing member 46, the connection terminal 44 is preliminarily fixed to the exposed section 42a of each lead frame 42. Consequently, when the ring shaped bus rings 41U, 41V, and 41W for the plurality of phases fixed by the fixing member 45 and the terminal section fixing member 46 are attached within the electric power collection/distribution member housing section 32b, each lead frame 42 and the stator coil 34 are easily connected to each other via the connection terminal 44 only in a single operation of connecting between the leader line section 34a of each stator coil 34 and the connection terminal 44 by means of fusing (thermal caulking) or the like. That is to say, it is possible to prevent an excessive increase in the working area within the electric power collection/distribution member housing section 32b (for example, the working area a shown in FIG. 5) required for this connecting operation, while preventing a reduction in the degree of freedom in the spatial designing for the rotary electric machine. Furthermore, it is possible to reduce the number of components and the cost required for the configuration thereof, while simplifying the manufacturing steps.

Figure 10:
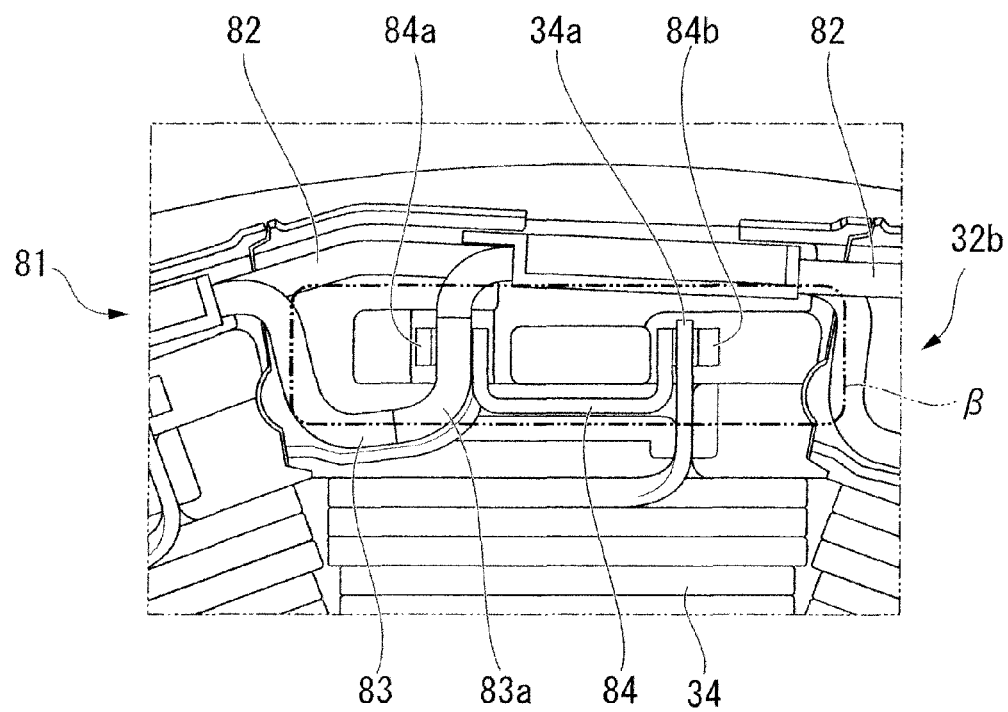
FIG. 10 is a plan view showing a principal part of the stator according to a comparative example of the embodiment.
Figure 11:
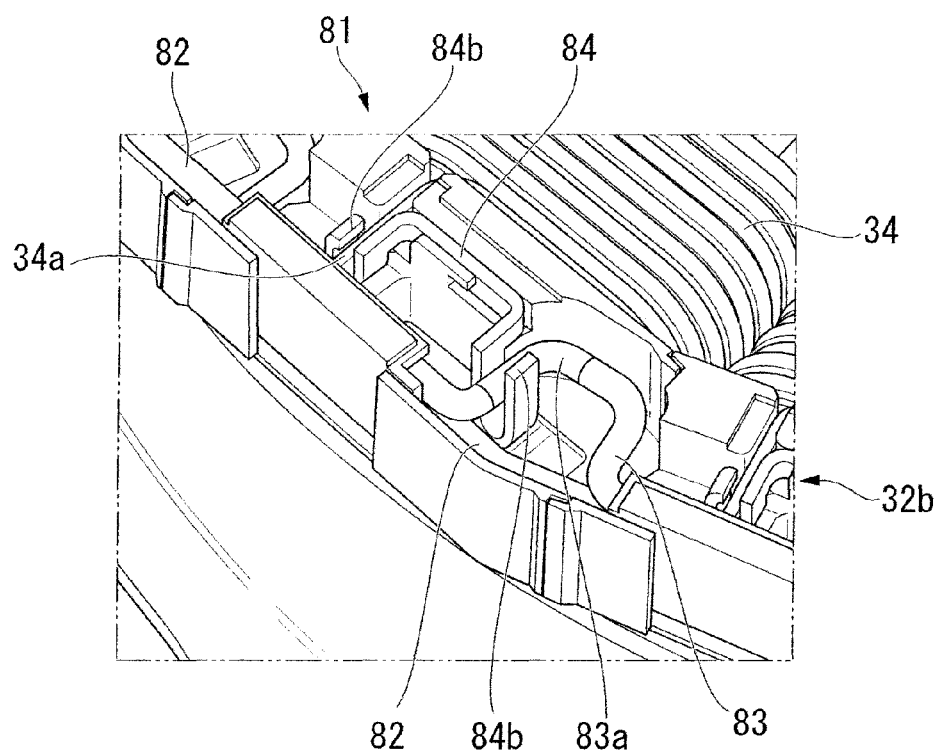
FIG. 11 is a perspective view showing a principal part of the stator according to the comparative example of the embodiment.

FIG. 10 and FIG. 11 show a comparative example of the electric power collection/distribution member according to the embodiment described above. An electric power collection/distribution member 81 according to the present comparative example is provided on the radially outer side of the plurality of concentrated-winding stator coils 34. A wire connection member 84 is arranged so as to adjacent to a terminal section 83 in the circumferential direction, the terminal section 83 protruding radially inward from a lead frame 82 corresponding to each phase of the electric power collection/distribution member 81 and being curved in a U shape. A circumferential direction one end section 83a of the terminal section 83 (that is, the portion in which an insulating coating (not shown in the drawing) has been removed and a lead frame main body is exposed) and a circumferential direction other end section 84a of the wire connection member 84, are connected to each other by means of fusing. In the present comparative example, in process of connecting the leader line section 34a of the stator coil 34 to the circumferential direction one end section 84b of the wire connection member 84 by means of fusing, fusing (thermal caulking) needs to be carried out twice for connecting the stator coil 34 and the lead frame 82 for each phase in a state where the electric power collection/distribution member 81 is arranged on the radially outer side of the stator coil 34. In this case, the working area within the electric power collection/distribution section housing member 32*b* required for this fusing operation (for example, the working area β shown in FIG. 10) increases, and a relatively larger space is required for housing the terminal section 83 and the wire connection member 84. Consequently, the rotary electric machine provided with the electric power collection/distribution member 81 becomes comparatively larger. Furthermore, in this case, it becomes difficult to increase the number of pole pairs without increasing the radial direction dimension of the rotary electric machine. As a result, there is a problem of a reduced degree of freedom in the spatial designing for the rotary electric machine.

On the other hand, according to the above embodiment of the present invention, since the connection terminal 44 is preliminarily connected to the lead frame 42, the space required for housing the connection terminal 44 is relatively smaller. As a result, the number of pole pairs of the rotary electric machine can be increased while suppressing an increase in the radial direction dimension of the rotary electric machine.

Moreover, since the connection terminal 44, the fixing member 45, and the terminal section fixing member 46 are arranged so as not to overlap on each other in the circumferential direction, it is possible to appropriately ensure a desired working area required for molding with use of a resin material.

Furthermore, since the positioning member 51 that positions and fixes the leader line section 34*a* and guides it to the coil connection section 44*c* of the terminal section 44 is provided in the electric power collection/distribution member housing section 32*b*, it is possible to improve the level of precision in positioning the leader line section 34*a* of the stator coil 34.

In addition, this positioning member 51 is provided in a position displaced to one side in the circumferential direction from the circumferential position of the center axis of the stator coil 34 (that is to say, displaced to the winding direction of the conductive wire being wound on the bobbin section of the insulating bobbin 32). Consequently, bending processing can be appropriately performed when leading out the leader line section 34*a* radially outward from the stator coil 34. For example, even in the case where edgewise bending is required in a rectangular wire, it is possible to prevent a disturbance being generated in conductive wire winding.

Furthermore, the connection terminal 44 is provided with: the bus ring fixing section 44*a* and the coil connection section 44*c* arranged so as to overlap on each other in the circumferential direction; and the extended curvature section 44*b* that curves toward the other side in the circumferential direction while bypassing the positioning member 51 provided within the electric power collection/distribution member housing section 32*b*. Consequently, it is possible to prevent the connection terminal 44 from becoming excessively large within the electric power collection/distribution member housing section 32*b*. As a result, it is possible to prevent a reduction in the degree of freedom in the spatial designing for the rotary electric machine.

Second Embodiment

Hereunder, an electric power collection/distribution ring (connection structure for electric power collection/distribution) of a rotary electric machine according to a second embodiment of the present invention is described, with reference to the accompanying drawings.

The electric power collection/distribution ring of a rotary electric machine according to the present embodiment (for example, a ring shaped stator set 112 and an electric power collection/distribution member 113 described later) may be used for a stator 101 of a rotary electric machine to be installed, for example, as a travelling drive source in a vehicle such as a hybrid vehicle or an electric vehicle.

Figure 12:
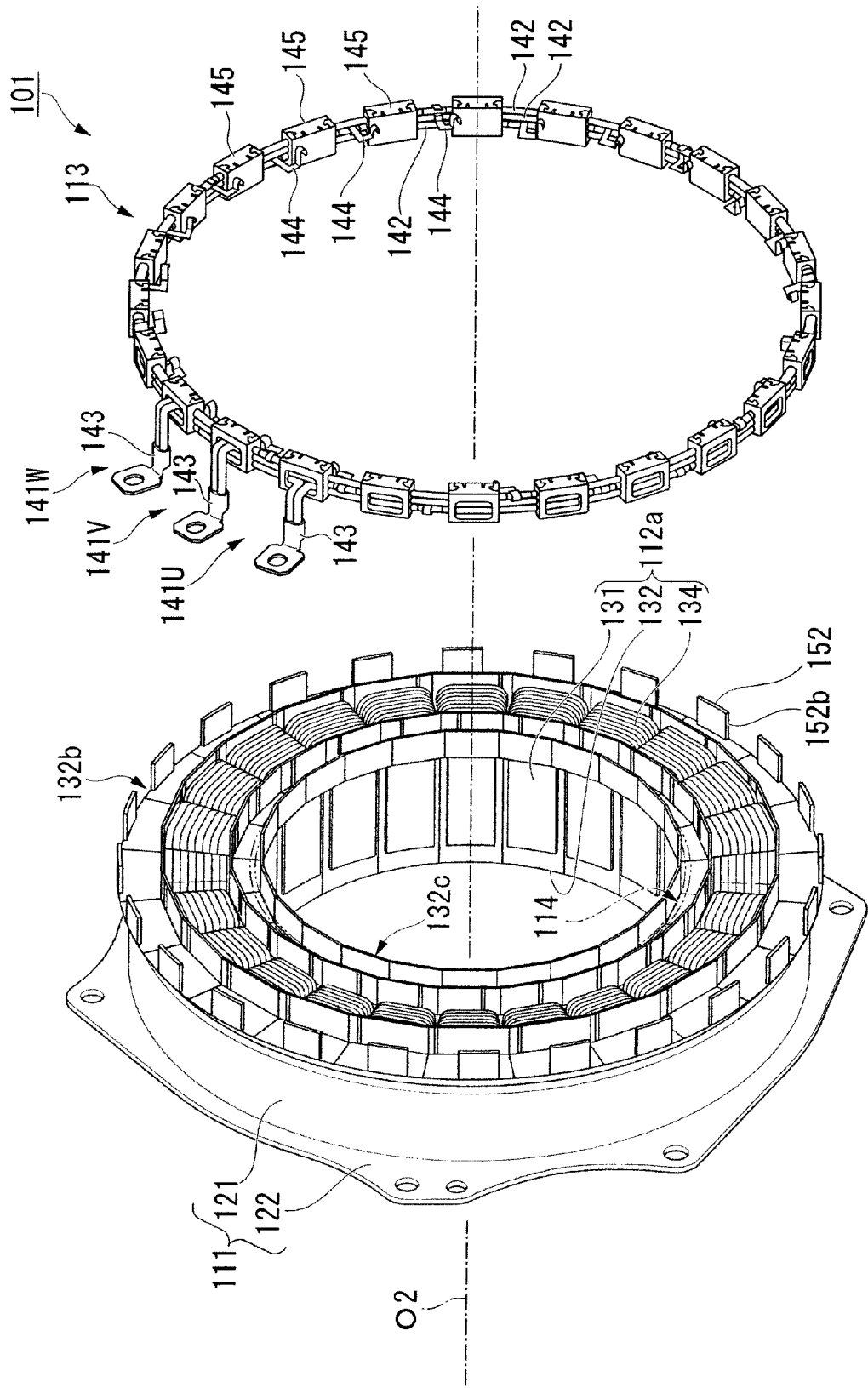
FIG. 12 is an exploded perspective view of a stator according to a second embodiment of the present invention.
Figure 13:
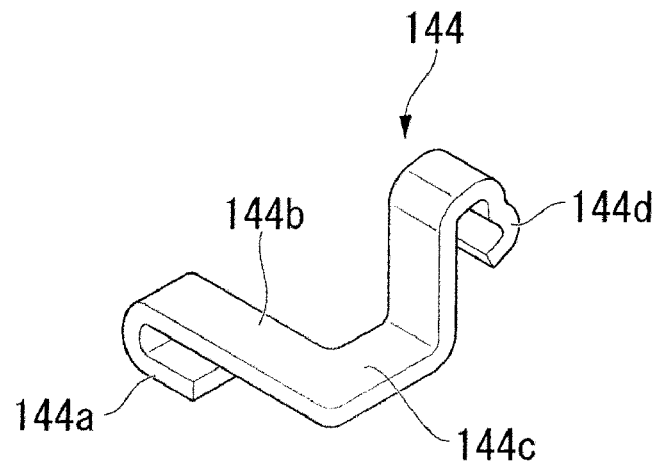
FIG. 13 is a perspective view of a connection terminal according to the embodiment.
Figure 14:
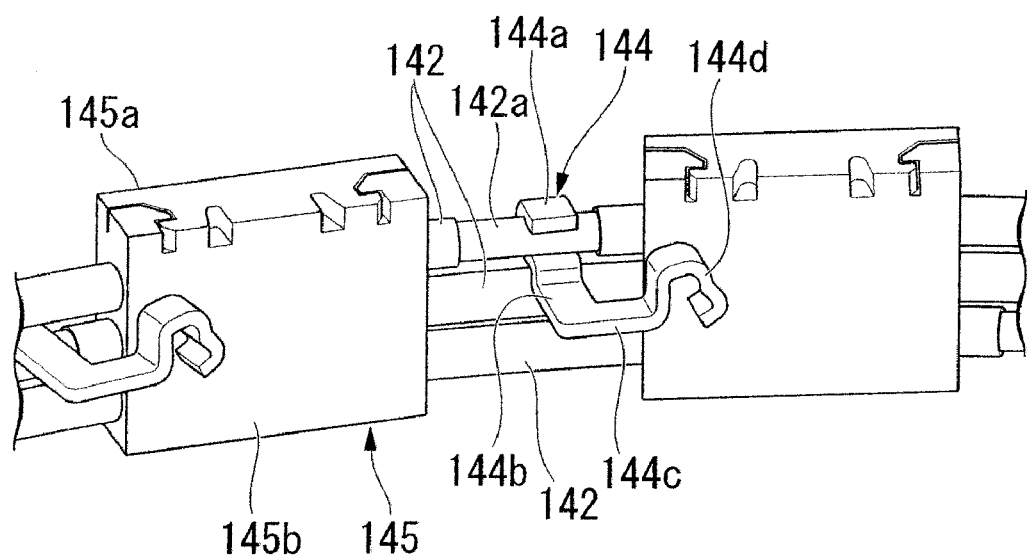
FIG. 14 is a perspective view showing a principal part of an electric power collection/distribution member according to the embodiment.
Figure 15:
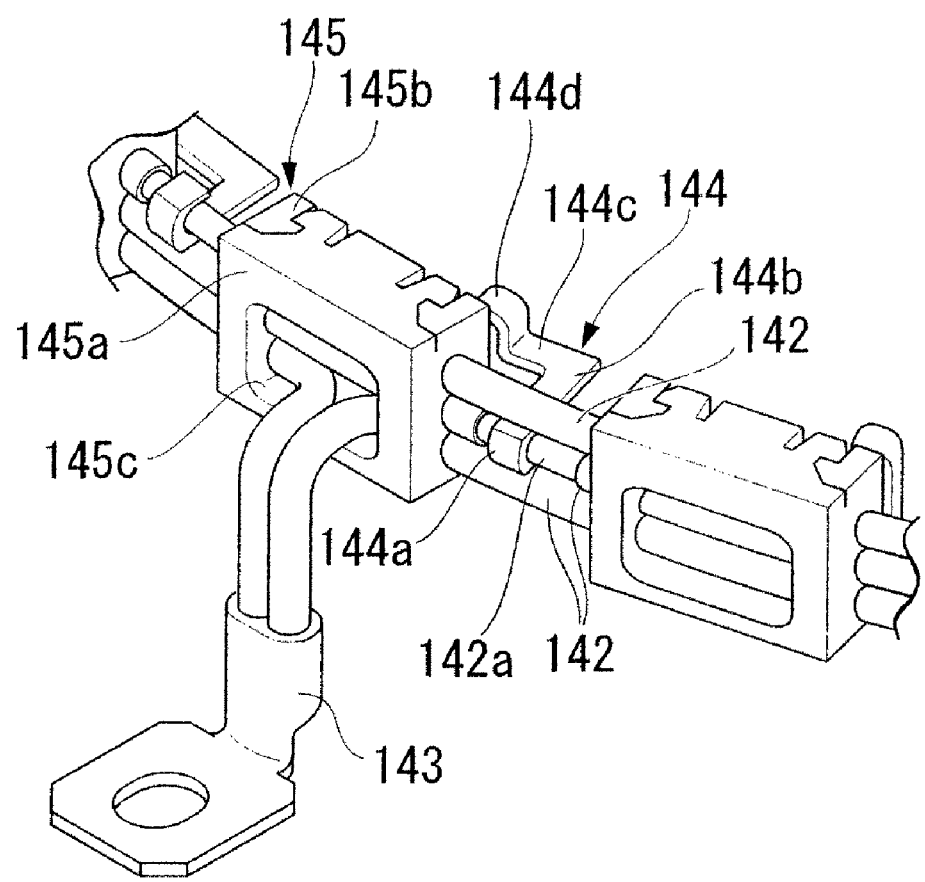
FIG. 15 is a perspective view showing the principal part of an electric power collection/distribution member according to the embodiment.
Figure 16:
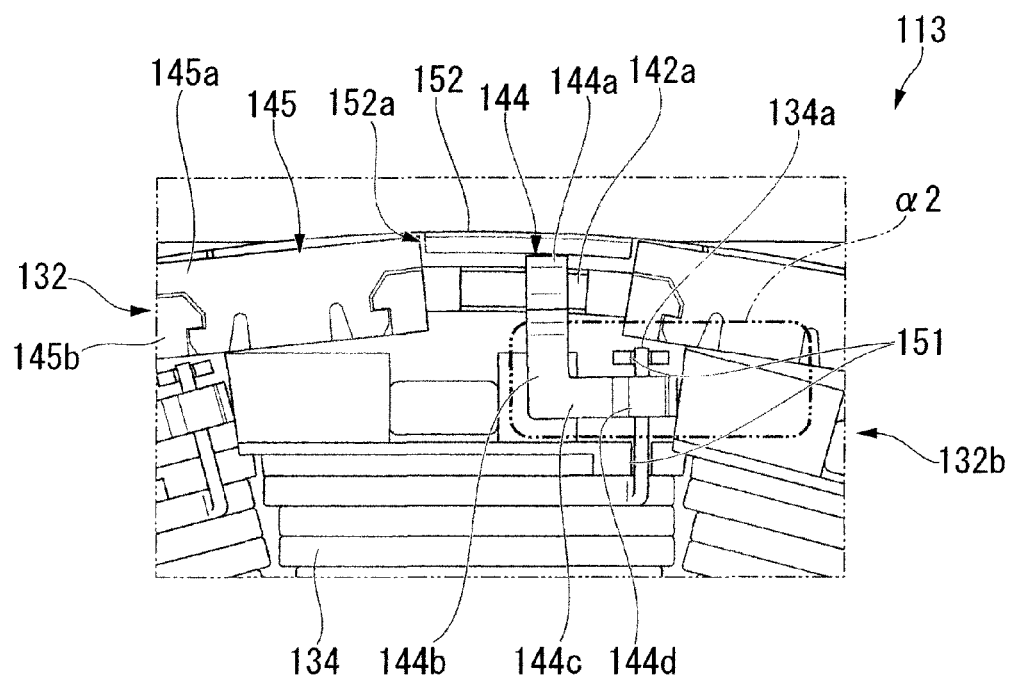
FIG. 16 is a plan view showing a principal part of the stator according to the embodiment.
Figure 17:
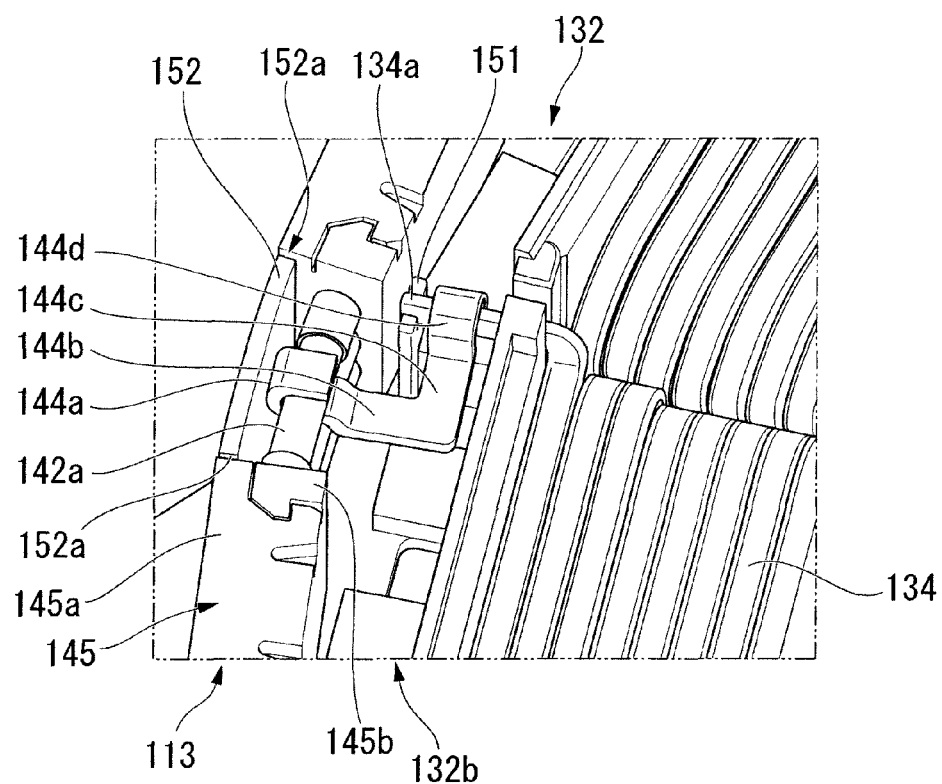
FIG. 17 is a perspective view showing the principal part of the stator according to the embodiment.
Figure 18:
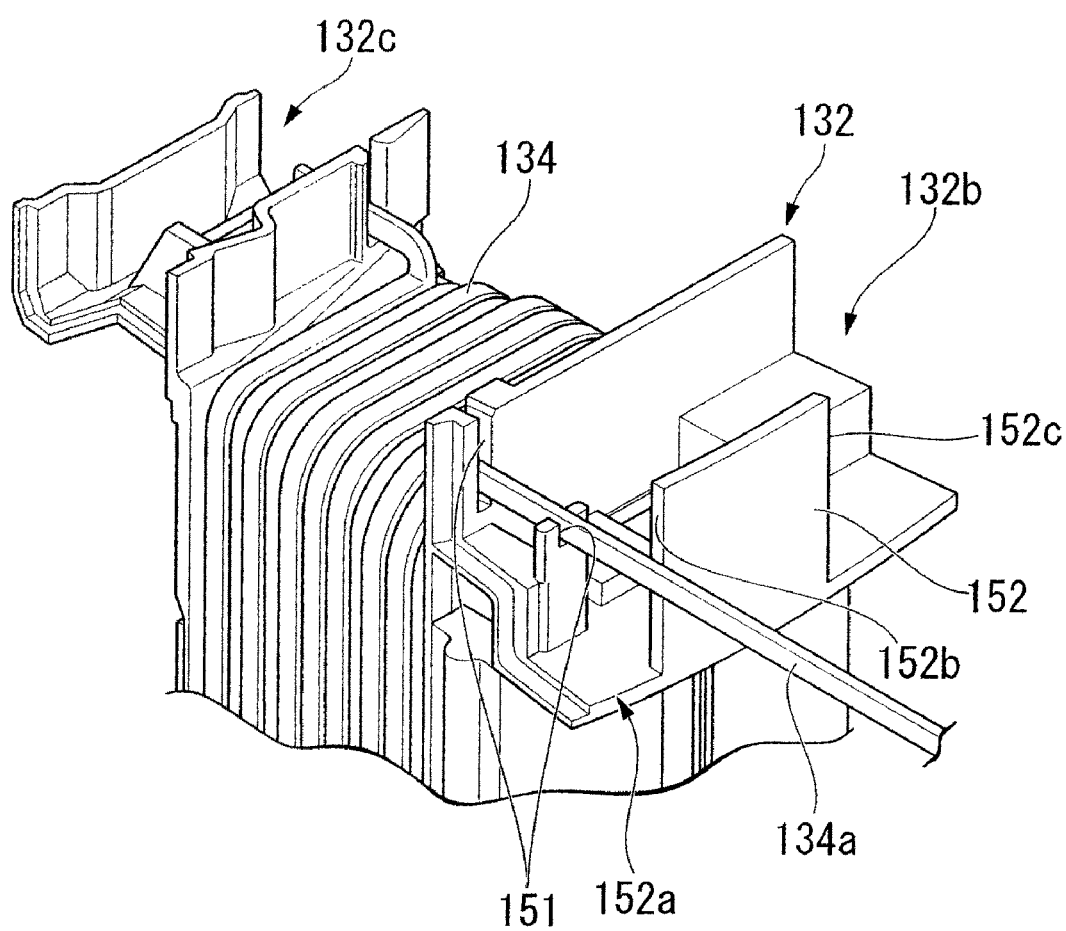
FIG. 18 is a perspective view showing the principal part of the insulating bobbin and the electric power collection/distribution member housing section according to the embodiment.
Figure 19:
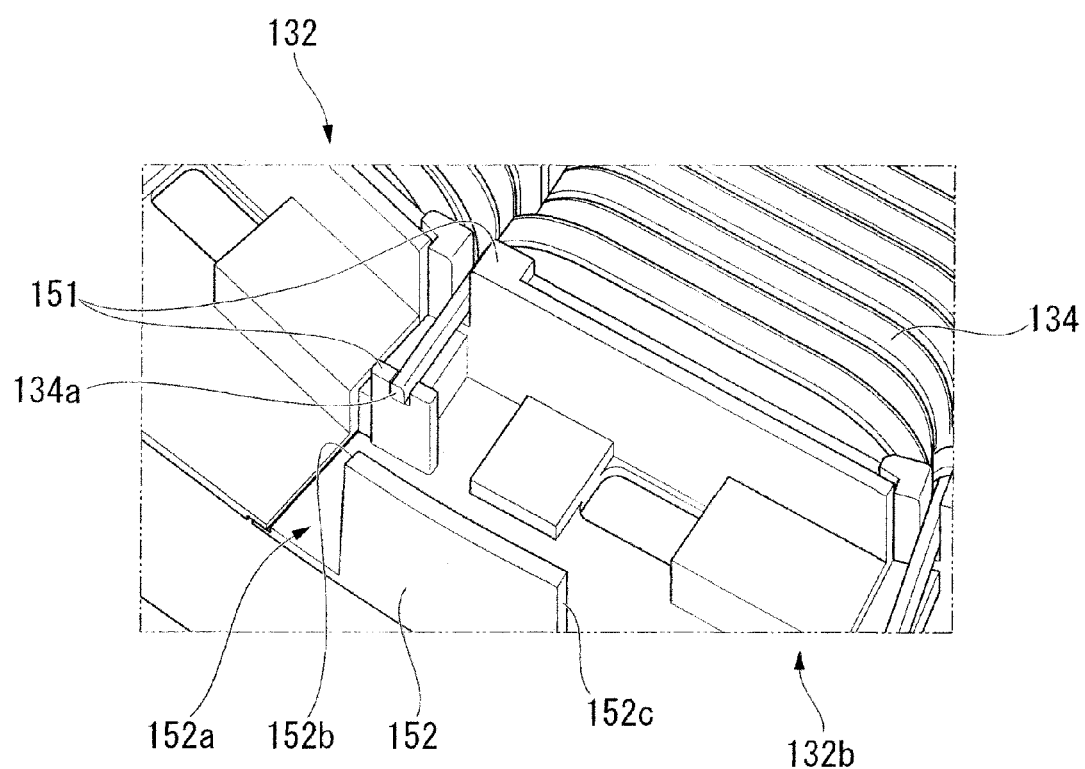
FIG. 19 is a perspective view showing the principal part of the insulating bobbin and the electric power collection/distribution member housing section according to the embodiment.

The stator 101, for example, is an inner rotor type stator in which a rotor (not shown in the drawing) is to be arranged on the inner circumferential side thereof as shown in FIG. 12.

The stator 101 is provided, for example, with a stator holder 111, a ring shaped stator set 112 including a plurality of stator pieces 112*a* arranged in a ring shape, a ring shaped electric power collection/distribution member 113, and a middle point connection member 114.

The stator holder 111 is provided with a cylindrical section 121, and a flange section 122 that is provided so as to project radially outward at one end thereof in the axial direction of this cylindrical section 121.

For example, bolts (not shown in the drawing) inserted through bolt attachment holes (not shown in the drawing) provided in the flange section 122 are screwed on a housing (not shown in the drawing) that houses the cylindrical section 121 therein, and the stator holder 111 is thereby fixed.

Inside the cylindrical section 121 of the stator holder 111 there is housed, by means of press fitting or the like, the ring shaped stator set 112.

The ring shaped stator set 112 includes a predetermined number of the stator pieces 112*a* arranged in a ring shape.

Each of the stator pieces 112*a* is provided with a split core 131 formed with a plurality of, for example, substantially T shaped silicon steel plates, an insulating bobbin 132 to be attached on the split core 131 formed with an insulating resin material, and a stator coil 134 wound on the insulating bobbin 132.

The split core 131 is provided with teeth (not shown in the drawing) having mutually substantially equal thicknesses in the axial direction, and a yoke (not shown in the drawing). The yoke is provided integrally with the radial direction base end section of the teeth. The circumferential direction width of the yoke is formed greater than that of the teeth.

Both end surfaces in the circumferential direction of the yoke are of a shape that enables them to surface-contact with each other. In a state with the plurality of stator pieces 112*a* arranged in a ring shape, the ring shaped stator set 112 in a ring shape is formed, while keeping the yokes adjacent to each other in the circumferential direction in surface-contact with each other.

The insulating bobbin 132 can be split, for example, in the axial direction (that is, in the lamination direction of the split core 131). Insulating bobbin members split into two are attached to the split core 131 so as to sandwich the split core 131 at both sides thereof in the axial direction thereof.

The insulating bobbin 132 is provided with: a bobbin section that for example is externally fitted on the teeth of the split core 131; an electric power collection/distribution member housing section 132*b* that extends from the bobbin section to the yoke side of the split core 131 (that is, radially outward) so as to cover the other end surface in the axial direction of the yoke; and a middle point connection member housing section 132*c* that, on the other side in the lamination direction the same as that of the electric power collection/distribution member housing section 132b, extends from the bobbin section in a direction going away from the yoke (that is, radially inward).

On the bobbin section of the insulating bobbin 132 there is wound the stator coil 134.

Moreover, in the electric power collection/distribution member housing section 132b there is housed the electric power collection/distribution member 113. In the middle point connection member housing section 132c there is housed the middle point connection member 114.

The electric power collection/distribution member 113 is provided with ring shaped bus rings 141U, 141V, and 141W corresponding to a plurality of phases that is connected to the plurality of stator coils 134 corresponding to the plurality of phases (for example, three phases namely U phase, V phase and W phase). The bus rings 141U, 141V, and 141W for each phase of the plurality of phases have mutually substantially the same shape. The bus rings 141U, 141V, and 141W are provided with: a ring shaped lead frame 142; a feeding terminal 143 provided on this lead frame 142; a plurality of connection terminals 144 that are fixed in a predetermined position in the circumferential direction of the lead frame 142 (that is, in a position at predetermined intervals in the circumferential direction) so as to protrude radially inward and to be connected to each of the plurality of stator coils 134; and a plurality of fixing members 145 having the same shape that are attached in a predetermined position in the circumferential direction of the ring shaped bus rings 141U, 141V, and 141W of the plurality of phases so as to fix the bus rings 141U, 141V, and 141W for the plurality of phases.

Between the respective bus rings 141U, 141V, and 141W, the shape of the lead frames 142 and the fixing members 145 are respectively the same. Moreover, the axial direction length of the feeding terminal 143 is set to a value for each bus ring so that differences in the axial direction position are compensated in a state where the respective bus rings 141U, 141V, and 141W are sequentially and coaxially laminated from one side to the other in the axial direction.

The ring shaped lead frame 142 is such that a conducting wire having an insulating coating thereon (not shown in the drawing) is formed in a ring shape, and one end section and the other end section of the conducting wire, that protrude radially outward and curved toward one side in the axial direction, are connected to the feeding terminal 143.

In a predetermined position in the circumferential direction of the lead frame 142 (that is, in a position at predetermined intervals in the circumferential direction), there is provided a portion (exposed section 142a) in which the insulating coating (not shown in the drawing) has been removed and the conductive wire main body is exposed. On this exposed section 142a there is connected and fixed a bus ring fixing section 144a of the connection terminal 144, for example, by means of fusing (thermal caulking) or the like.

The connection terminal 144, for example as shown in FIG. 13 to FIG. 17, is configured being provided with: the bus ring fixing section 144a fixed on the exposed section 142a of the lead frame 142; an extended section 144b that extends radially inward from the bus ring fixing section 144a; a bent section 144c that is bent toward one side in the circumferential direction from the radially inward side end section of the extended section 144b; and a coil connection section 144d that curves in substantially a U shape toward the axial direction in the circumferential direction tip end section of the bent section 144c.

The shape of the bus ring fixing section 144a and the coil connection section 144d of the connection terminal 144 is designed so that differences in the axial direction position are compensated in a state where the respective bus rings 141U, 141V, and 141W of the respective phases are sequentially and coaxially laminated from one side to the other in the axial direction.

The coil connection section 144d of the connection terminal 144 is connected to a leader line section 134a formed on one end of the stator coil 134, for example, by means of fusing (thermal caulking) or the like.

A step for configuring the electric power collection/distribution ring of a rotary electric machine according to the present embodiment is as follows. First, in the bus rings 141U, 141V, and 141W for each phase, the bus ring fixing section 144a of the connection terminal 144 is preliminarily fixed on the exposed section 142a of the lead frame 142, for example, by means of fusing (thermal caulking) or the like. Next, the ring shaped bus rings 141U, 141V, and 141W for the plurality of phases are fixed by the fixing member 145. Subsequently, the ring shaped bus rings 141U, 141V, and 141W for the plurality of phases fixed by the fixing members 145 are fitted within the electric power collection/distribution member housing section 132b. At this time, to the coil connection section 144d of the connection terminal 144 there is attached the leader line section 134a led out radially outward from the stator coil 134. Furthermore, in the coil connection section 144d of the connection terminal 144, for example, connecting operations such as fusing (thermal caulking) are performed, and the lead frame 142 and the stator coil 134 are thereby connected via the connection terminal 144.

In the electric power collection/distribution member housing section 132b there is arranged a positioning member 151 that positions the leader line section 134a led out radially outward from the stator coil 134 wound on the bobbin section of the insulating bobbin 132 while guiding it to the coil connection section 144d of the connection terminal 144. In particular, the positioning member 151 is provided in a position displaced to one side in the circumferential direction from the circumferential position of the center axis of the stator coil 134 (that is to say, displaced to the winding direction of the conductive wire being wound on the bobbin section of the insulating bobbin 132).

The fixing member 145 is formed in a substantially rectangular plate shape with an electrically insulative material. The fixing members 145 are attached in a predetermined position in the circumferential direction of the ring shaped bus rings 141U, 141V, and 141W for the plurality of phases, so as to sandwich each lead frame 142 at both sides thereof in the radial direction (that is to say, in a position at predetermined intervals in the circumferential direction). Moreover, the fixing member 145 is provided with an outer circumferential side member 145a and an inner circumferential side member 145b that are integrally fixed by being fitted to each other. In the outer circumferential side member 145a there is provided a through hole 145c through which the feeding terminal 143 provided in the lead frame 142 can be inserted.

Furthermore, it is possible to attach the fixing member 145 to a hole section 152a provided in an outer circumferential wall section 152 of the electric power collection/distribution member housing section 132b. In a state where the electric power collection/distribution member 113 is housed within the electric power collection/distribution member housing section 132b, the attached fixing member 145 covers in the hole section 152a of the outer circumferential wall section 152. Within the electric power collection/distribution member housing section 132b with the electric power collection/distribution member 113 housed therein, there is filled an insulative resin material (not shown in the drawing).

The outer circumferential wall section 152 of the insulating bobbin 132 is provided so as to cover, from the radially outer side, the electric power collection/distribution member 113 housed within the electric power collection/distribution member housing section 132b. Moreover, in the electric power collection/distribution member housing section 132b there is provided a cutaway section 152b formed by cutting away a part of the outer circumferential wall section 152. The cutaway section 152b is formed as a cutaway in the end section on one side in the circumferential direction of the outer circumferential wall section 152, in a position on the radially outer side of the positioning member 151 provided within the electric power collection/distribution member housing section 132b. Moreover, in the end section on the other side in the circumferential direction of the outer circumferential wall section 152 there is also formed a cutaway section 152c. Furthermore, the cutaway section 152b and the cutaway section 152c of the respective insulating bobbins 132, that are provided in the stator pieces 112a and are mutually adjacent in the circumferential direction, form a hole section 152a that passes through the outer circumferential wall section 152 in the radial direction.

Consequently, the fixing member 145 covers in an area between the outer circumferential wall sections 152 of the insulating bobbins 132 mutually adjacent in the circumferential direction. Therefore, compared to the case of, for example, arranging the fixing member 145 in another position other than the position between the outer circumferential wall sections 152 mutually adjacent in the circumferential direction (such as a position in the center section in the circumferential direction of the outer circumferential wall section 152), it is possible to reduce the locations of matching surfaces. As a result, it is possible to easily prevent the insulative resin material (not shown in the drawing) filled within the electric power collection/distribution member housing section 132 from being leaked to the outside.

Moreover, the cutaway section 152b of the outer circumferential wall section 152 is provided in a position on the radially outer side of the leader line section 134a that is positioned by the positioning member 151 and is led out radially outward from the stator coil 134. The cutaway section 152b is required for leading out the conductive wire radially outward after having been wound on the bobbin section of the insulating bobbin 132 when the stator coil 134 is formed with the conductive wire. Furthermore, the cutaway section 152b is required for arranging a tool or the like (not shown in the drawing) for cutting the conductive wire in a predetermined position in the radial direction when the conductive wire led out radially outward is cut to form the leader line section 134a.

The respective bus rings 141U, 141V, and 141W are mutually fixed by a plurality of the fixing members 145 so as to be sequentially and coaxially laminated from one side to the other in the axial direction while being respectively displaced by a predetermined angle. That is to say, the respective connection terminals 144 fixed to the respective lead frames 142 of the respective bus rings 141U, 141V, and 141W, are sequentially arranged at predetermined intervals in the circumferential direction.

The stator coils 134 of the stator pieces 112a corresponding to the same phase are connected to each other. Specifically, the leader line sections 134a formed in one end of the stator coil 134 of each stator piece 112a corresponding to the U phase, are connected to each other via the bus ring 141U. The leader line sections 134a formed in one end of the stator coil 134 of each stator piece 112a corresponding to the V phase, are connected to each other via the bus ring 141V. Moreover, the leader line sections 134a formed in the stator coil 134 of each stator piece 112a corresponding to the W phase, are connected to each other via the bus ring 141W.

The middle point connection member 114, for example as shown in FIG. 12, is provided with a connecting member 114a that connects other ends of the respective stator coils 134 of the stator pieces 112a adjacent to each other in the circumferential direction by means of fusing (thermal caulking) or the like. The middle point connection member 114 connects the other ends of the stator coils 134 of the stator pieces 112a that correspond to all of the phases. Within the middle point connection member housing section 132c with the middle point connection member 114 housed therein, there is filled an insulative resin material (not shown in the drawing).

As described above, according to the electric power collection/distribution ring of the rotary electric machine according to the present embodiment, in the ring shaped bus rings 141U, 141V, and 141W for the plurality of phases fixed by the fixing member 145, the connection terminal 144 is preliminarily fixed to the exposed section 142a of each lead frame 142. Consequently, when the ring shaped bus rings 141U, 141V, and 141W for the plurality of phases fixed by the fixing member 145 are attached within the electric power collection/distribution member housing section 132b, each lead frame 142 and the stator coil 134 are easily connected to each other via the connection terminal 144 only in a single operation of connecting between the leader line section 134a of each stator coil 134 and the connection terminal 144 by means of fusing (thermal caulking) or the like. That is to say, it is possible to prevent an excessive increase in the working area within the electric power collection/distribution member housing section 132b (for example, the working area α2 shown in FIG. 16) required for this connecting operation, while preventing a reduction in the degree of freedom in the spatial designing for the rotary electric machine. Furthermore, it is possible to reduce the number of components and the cost required for the configuration thereof, while simplifying the manufacturing steps.

Figure 20:
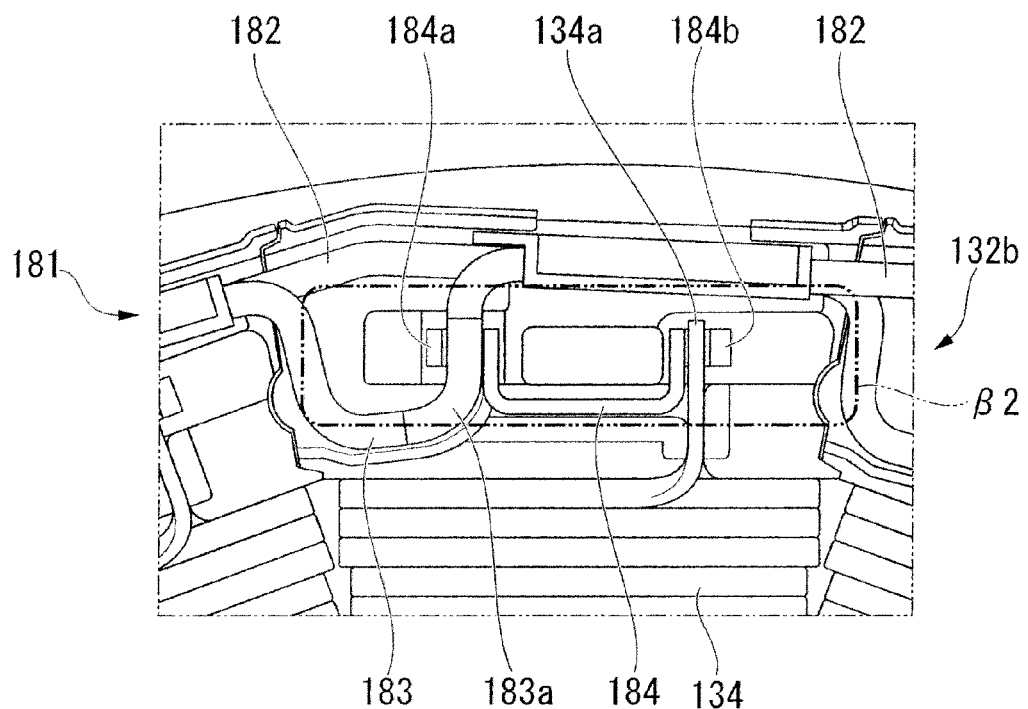
FIG. 20 is a plan view showing a principal part of the stator according to a comparative example of the embodiment.
Figure 21:
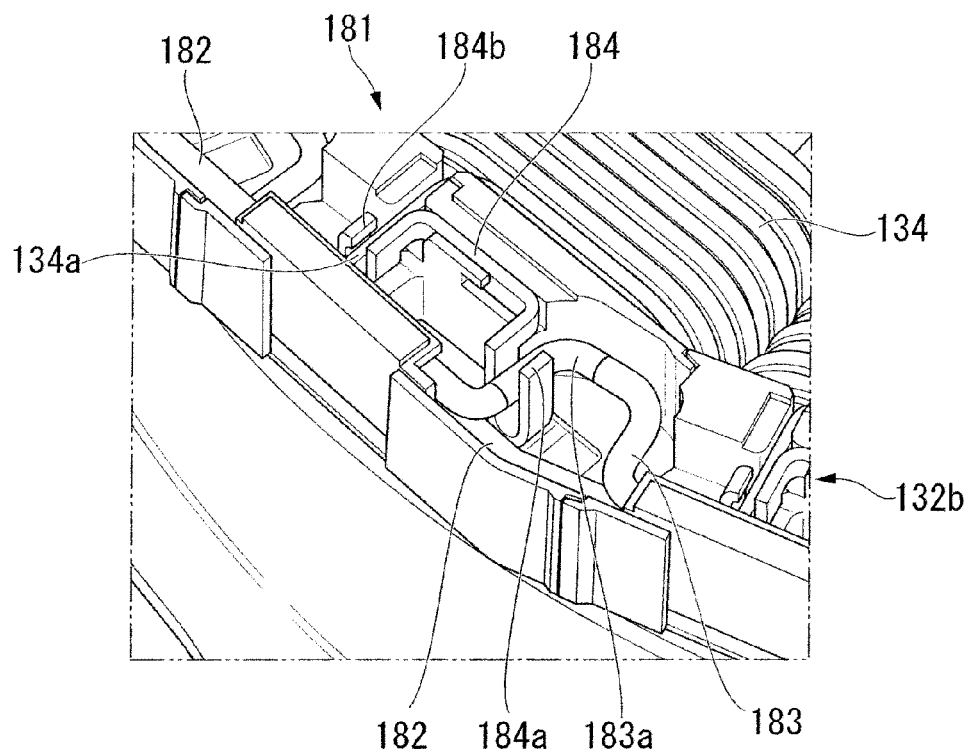
FIG. 21 is a perspective view showing the principal part of the stator according to the comparative example of the embodiment.

FIG. 20 and FIG. 21 show a comparative example of the electric power collection/distribution ring according to the embodiment described above. An electric power collection/distribution member 181 according to the present comparative example is provided on the radially outer side of the plurality of concentrated-winding stator coils 134. A wire connection member 184 is arranged so as to adjacent to a terminal section 183 in the circumferential direction, the terminal section 183 protruding radially inward from a lead frame 182 corresponding to each phase of the electric power collection/distribution member 181 and being curved in a U shape. A circumferential direction one end section 183a of the terminal section 183 (that is, the portion in which an insulating coating (not shown in the drawing) has been removed and a lead frame main body is exposed) and a circumferential direction other end section 184a of the wire connection member 184, are connected to each other by means of fusing. In the present comparative example, in process of connecting the leader line section 134a of the stator coil 134 to the circumferential direction other end section 184a of the wire connection member 184 by means of fusing, fusing (thermal caulking) needs to be carried out twice for connecting the stator coil 134 and the lead frame 182 for each phase in a state where the electric power collection/distribution member 181 is arranged on the radially outer side of the stator coil 134. In this case, the working area within the electric power collection/distribution section housing member 132b required for this fusing operation (for example, the working area β2 shown in FIG. 20) increases, and a relatively larger space is required for housing the terminal section 183 and the wire connection member 184. Consequently, the rotary electric machine provided with this electric power collection/distribution member 181 becomes comparatively larger. Furthermore, in this case, it becomes difficult to increase the number of pole pairs without increasing the radial direction dimension of the rotary electric machine. As a result, there is a problem of a reduced degree of freedom in the spatial designing for the rotary electric machine.

On the other hand, according to the above embodiment of the present invention, since the connection terminal 144 is preliminarily connected to the lead frame 142, the space required for housing the connection terminal 144 is relatively smaller. As a result, the number of pole pairs of the rotary electric machine can be increased while suppressing an increase in the radial direction dimension of the rotary electric machine.

Furthermore, the fixing member 145 made of an electrically insulative material enables to ensure a desired insulation between the bus rings 141U, 141V, and 141W, and the leader line section 134a of the stator coil 134. Moreover, the fixing member 145 enables to form a closed space around the bus rings 141U, 141V, and 141W and the leader line section 134a to be filled with an insulating agent.

Furthermore, since the plurality of fixing members 145 that sandwich the bus rings 141U, 141V, and 141W at both sides thereof in the radial direction have mutually the same shape, it is possible to reduce the number of components and the cost required for configuring the electric power collection/distribution member 113, while simplifying the step for configuring the electric power collection/distribution member 113 and enabling easy fixation of the bus rings 141U, 141V, and 141W.

Among the outer circumferential side member 145a and the inner circumferential side member 145b of the fixing member 145 that sandwich the lead frame 142 at both sides thereof in the radial direction, in the outer circumferential side member 145a there is provided the through hole 145c through which the feeding terminal 143 provided in the lead frame 142 can be inserted. Therefore, even in the position where the feeding terminal 143 of the lead frame 142 is provided, the fixing member 145 can be attached to the lead frame 142.

Furthermore, since the positioning member 151 that positions and fixes the leader line section 134a and guides it to the coil connection section 144d of the terminal section 144 is provided in the electric power collection/distribution member housing section 132b, it is possible to improve the level of precision in positioning the leader line section 134a of the stator coil 134.

In addition, this positioning member 151 is provided in a position displaced to one side in the circumferential direction from the circumferential position of the center axis of the stator coil 134 (that is to say, displaced to the winding direction of the conductive wire being wound on the bobbin section of the insulating bobbin 132). Consequently, bending processing can be appropriately performed when leading out the leader line section 134a radially outward from the stator coil 134. For example, even in the case where edgewise bending is required in a rectangular wire, it is possible to prevent a disturbance being generated in conductive wire winding.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electric power collection/distribution ring of a rotary electric machine comprising:
    a plurality of ring shaped bus rings each of which is formed by a conducting wire formed in a ring shape and is to be connected to one of a plurality of coils provided in the rotary electric machine, the coils each corresponding to phases of the rotary electric machine;
    a plurality of fixing members which are fixed to the bus rings and arranged along the circumferential direction thereof; and
    a plurality of connection terminals which are separately formed from the bus rings and are fixed to the bus rings and arranged along said circumferential direction, and which can be connected with one of leader line sections of the coils.

2. The electric power collection/distribution ring of a rotary electric machine according to claim 1, wherein:
    the connection terminals extends radially inward from the bus rings;
    the fixing members are formed by performing molding of resin material on the bus rings; and
    the connection terminals and the fixing members are arranged so as not to overlap on each other in said circumferential direction.

3. The electric power collection/distribution ring of a rotary electric machine according to claim 1, wherein
    insulating members that each hold one of the coils has a holding member which positions and fixes one of the leader line sections of the coils.

4. The electric power collection/distribution ring of a rotary electric machine according to claim 3, wherein
    each of the holding members is arranged in a position displaced from the center axis of the insulating members in said circumferential direction.

5. An electric power collection/distribution ring of a rotary electric machine comprising:
    a plurality of ring shaped bus rings each of which is to be connected to one of a plurality of coils provided in the rotary electric machine, the coils each corresponding to phases of the rotary electric machine;
    a plurality of fixing members which are fixed to the bus rings and arranged along the circumferential direction thereof; and
    a plurality of connection terminals which are fixed to the bus rings and arranged along said circumferential direction, and which can be connected with one of leader line sections of the coils, wherein:
    insulating members that each hold one of the coils has a holding member which positions and fixes one of the leader line sections of the coils,
    the connection terminals have: a bus ring fixing section which is fixed on the bus rings; an extended section which extends radially inward from the bus ring fixing section; and a coil connection section to be connected with the leader line section of the coils in a tip of the extended section;
    the bus ring fixing section and the coil connection section are arranged so that positions thereof overlap on each other in said circumferential direction;
    the holding member is arranged in between the bus ring fixing section and the coil connection section; and the extended section includes a bypass section which bypasses the holding member.

6. An electric power collection/distribution ring of a rotary electric machine comprising:
a plurality of ring shaped bus rings each of which is to be connected to one of a plurality of coils provided in the rotary electric machine, the coils each corresponding to phases of the rotary electric machine;
a plurality of fixing members which are fixed to the bus rings and arranged along the circumferential direction thereof; and
a plurality of connection terminals which are fixed to the bus rings and arranged along said circumferential direction, and which can be connected with one of leader line sections of the coils, wherein:
the connection terminals are provided with: a bus ring fixing section which is fixed on one of the bus rings; an extended curvature section which extends radially inward from the bus ring fixing section and that curves in said circumferential direction; and a coil connection section which is to be connected with one of the leader line sections in a tip of the extended curvature section; and
the coil connection section is arranged on the inner side of the fixing members in the radial direction of the bus ring.

7. The electric power collection/distribution ring according to claim 6, wherein
the bus rings are sandwiched at both sides thereof by the fixing members so as to be mutually fixed.

8. The electric power collection/distribution ring according to claim 6, wherein
insulating members that each hold one of the coils has a holding member which positions and fixes one of the leader line sections of the coils.

9. The electric power collection/distribution ring according to claim 8, wherein
each of the holding members is arranged in a position displaced from the center axis of the coils in said circumferential direction.

10. The electric power collection/distribution ring according to claim 1, wherein
the bus rings are sandwiched at both sides thereof by the fixing members so as to be mutually fixed.

11. The electric power collection/distribution ring according to claim 10, wherein
insulating members that each hold one of the coils has a holding member which positions and fixes one of the leader line sections of the coils.

12. The electric power collection/distribution ring according to claim 11, wherein
each of the holding members is arranged in a position displaced from the center axis of the coils in said circumferential direction.

13. A stator comprising:
the electric power collection/distribution ring of a rotary electric machine according to claim 1; and
an electric power collection/distribution ring housing section that houses the electric power collection/distribution ring, wherein:
the electric power collection/distribution ring housing section has an insulating member that holds the coils; and
the insulating member has a holding member that positions and fixes one of the leader line sections of the coils.

14. An electric power collection/distribution ring of a rotary electric machine comprising:
a plurality of ring shaped bus rings each of which is to be connected to one of a plurality of coils provided in the rotary electric machine, the coils each corresponding to phases of the rotary electric machine;
a plurality of fixing members which are fixed to the bus rings and arranged along the circumferential direction thereof; and
a plurality of connection terminals which are fixed to the bus rings and arranged along said circumferential direction, and which can be connected with one of leader line sections of the coils, wherein
insulating members that each hold one of the coils has a holding member including an inner holding section and an outer holding section that are separately disposed so as to be aligned along the radial direction of the bus rings and that each positions and fixed one of the leader line sections of the coils,
the connection terminals each comprises a bus ring fixing section fixed to one of the bus rings, and a coil connection section connected to one of the leader line sections, and
the coil connection section is capable of being positioned in between the inner holding section and the outer holding section.

* * * * *